United States Patent [19]

Bardsley

[11] Patent Number: 5,194,153
[45] Date of Patent: Mar. 16, 1993

[54] APPARATUS FOR SEALING A CENTER VALVE VACUUM FILTER

[75] Inventor: Donald E. Bardsley, Nashua, N.H.

[73] Assignee: Ingersoll-Rand Company, Woodcliff Lake, N.J.

[21] Appl. No.: 802,919

[22] Filed: Dec. 6, 1991

[51] Int. Cl.$^5$ .................................... B01D 33/067
[52] U.S. Cl. .................................. 210/392; 210/404; 210/406; 210/429; 277/29
[58] Field of Search ............... 210/390, 392, 394, 396, 210/402, 403, 404, 405, 406, 429; 277/3, 17, 29, 9

[56] References Cited

U.S. PATENT DOCUMENTS

| | | | |
|---|---|---|---|
| 2,615,575 | 10/1952 | Wright | 210/401 |
| 3,356,224 | 12/1967 | Orr | 210/401 |
| 3,517,818 | 6/1970 | Luthi | 210/404 |
| 3,667,614 | 6/1972 | Komline | 210/401 |
| 3,918,821 | 11/1975 | Schlegel et al. | 210/401 |
| 4,154,687 | 5/1979 | LaValley | 210/404 |
| 4,370,231 | 1/1983 | LaValley | 210/404 |
| 4,795,572 | 1/1989 | LaValley | 210/402 |
| 4,821,536 | 4/1989 | Bardsley | 210/402 |
| 4,973,407 | 11/1990 | Wagner | 210/391 |

Primary Examiner—Peter Hruskoci
Assistant Examiner—Robert James Popovics
Attorney, Agent, or Firm—Robert F. Palermo

[57] ABSTRACT

A seal for a rotating center valve vacuum filter drum has a non-flat cross section with an elastomeric core and a chemical resistant sheathing. The seal is installed under tension so that, as wear occurs during operation, positive sealing contact is maintained. The non-flat cross section provides a nesting relationship with the center valve slot and stationary shoe to resist any tendency to wander out of the slot.

10 Claims, 3 Drawing Sheets

APPARATUS FOR SEALING A CENTER VALVE VACUUM FILTER

BACKGROUND OF THE INVENTION

This invention relates to rotary drum filters and more particularly to vacuum filters having an externally secured valve generally located near the axial center of the drum filter.

At various times in processing of papermaking pulp, it is necessary to thicken or otherwise increase consistency of the pulp slurry. This is commonly accomplished on a drum filter having a perforated deck overlaying a series of axially oriented liquid channels which, as the drum rotates, sequentially conduct liquid towards a stationary valve which regulates the timing for discharging liquid from the channels and its eventual removal from the filter unit. In the case of a center valve filter such as considered here, the stationary center valve is held in a cooperating relationship with the open ends of the fluid channels and contained within a circumferential passageway about the drum bounded on its outer circumference by cover plates attached to the drum. As the drum rotates, the valve allows liquid to sequentially drain from the channels as they pass from sealing relationship with the ends of the valve and allow liquid to flow into the center of the drum. A sealed relationship between the stationary valve and channel ends is required to arrest drainage of the channels and prevent atmospheric air from leaking into the drum center. Additionally, the edges of the circumferential cover plates and the valve holding shoe must be sealed to prevent atmospheric air from entering the vacuous interior of the drum.

In center valve filters currently in use, sealing the slot between the stationary valve circumferential cover plates may be provided by a circumferential endless flat belt-like seal which covers the slot and rides over a valve holding shoe or alternatively by abutting flexible seal members, mounted on opposing circumferential cover plates, arranged to touch and thereby seal the slot and intended to maintain sealing contact as they move around the outer surfaces of the stationary valve holding pin. In either case, the required vacuum necessary to attain pulp thickening capacity and consistency has been subject to rapid degradation and loss due to the seal member losing its flexibility and elasticity as well as being subject to failure of the jointing of the ends of the sealing members as a result of temperature and chemical attack. In addition, wear of the sealing members and, in the case of the flat belt-like seal, uncovering of the slot between the cover plates due to wandering and/or curling of the sealing belts inhibits and/or causes drainage failure due to the ingress of air reducing the vacuum. Also as the material of the seal degrades, fragments of the seal material sluff off into the pulp slurry and cause paper defects.

The pulp contamination and/or the reduced filtering capacity require shutdown of the filter for seal replacement. Since standby equipment is never available, such shutdown results in a significant financial loss arising from lost production as well as a significant expense for the required disassembly and repair.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for sealing a center valve vacuum filter, against the leakage of atmospheric air into the central vacuous liquid collecting chamber by including a single piece circumferential seal for maintaining sealing contact between opposing edges of a circumferential slot bounded by adjacent valve cover plates on a rotating filter drum stationary valve holding shoe means.

The foregoing and other aspects will become apparent from the following detailed description of the invention when considered in conjunction with the accompanying drawing figures.

BRIEF DESCRIPTION OF THE DRAWINGS

FIG. 1 is a schematic sketch representing an elevation cross section of a center valve filter taken without the circumferential seal from line 1—1 of FIGS. 2, 2a, 3, and 3a;

DETAILED DESCRIPTION

Figure 1:
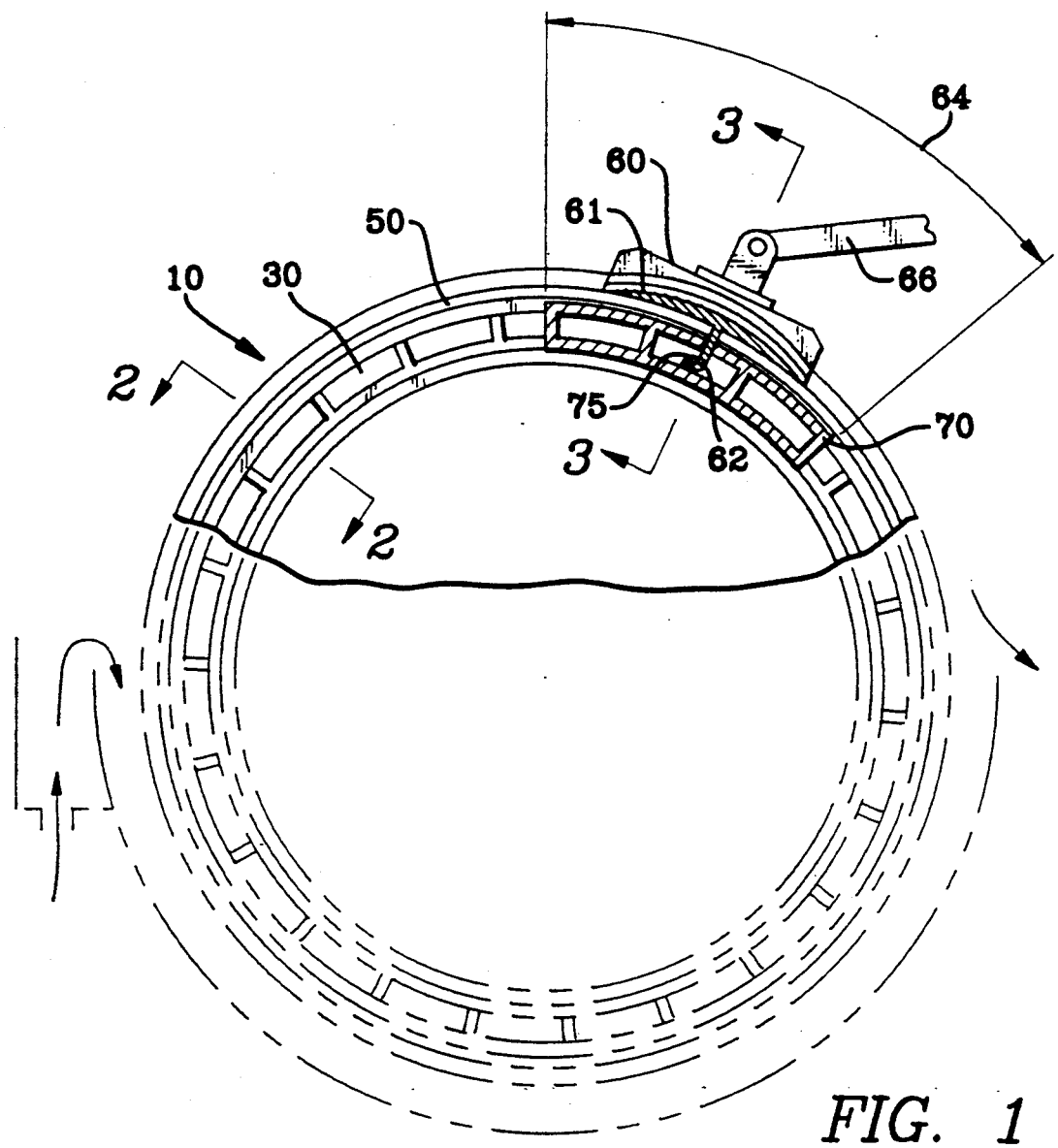

FIG. 1 illustrates a general layout of a center valve filter, without its seal, sectioned in its circumferential slot and viewed axially. Seal 100 circumscribes drum 10 which is defined by deck 20 overlying fluid channels 30. Seal 100 also passes over stationary valve holding shoe 60. Sealing faces 71 (FIG. 3) of stationary valve 70, throughout valve closure arc 64, sequentially obstruct drainage channels 30 as the drum rotates. In operation, drum 10 rotates clockwise while valve 70 and valve holding shoe 60 remain stationary held by arm 66 attached to the vat wall (not shown). Circular seal 100 rotates with drum 10 and slides in groove 65 over valve holding shoe 60 but is stationary with respect to valve cover plates 50 and deck 20. By providing a highly polished groove surface 61 on stationary valve holding shoe 60, wear on rotating circular seal 100 is minimized.

FIGS. 2, 2a, 3, and 3a which represent views from lines 2—2 and 3—3 in FIG. 1, illustrate additional features of the seal of the present invention. Here seal 100 is shown to have a core 102 in an outer covering 106. Preferably the core 102 is fabricated from an elastomeric material such as silicone rubber, or other elastomer having little or no expansion with varying temperature conditions. This is required to minimize expansion of the circumferential length of seal 100 and thereby eliminate any possibility of seal 100 losing contact with sealing edges 51 of cover plates 50. This precludes the ingress of air into vacuous chamber 35 which could induce loss of vacuum and hence reduced thickening and drainage capacity. The outer covering is preferably made from a material with excellent corrosion resistance such as polytetrafluoroethylene or other similar material.

Figure 2A:
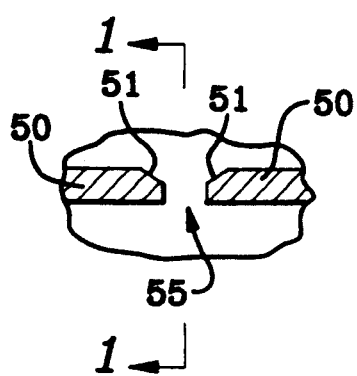
FIG. 2a is a partial view of FIG. 2 less the seal.
Figure 3A:
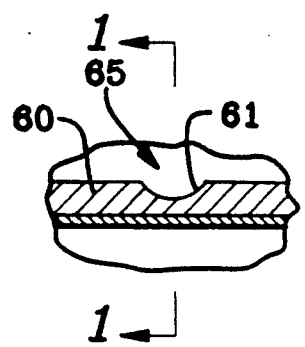
FIG. 3a is a partial view of FIG. 3 showing a seal groove in the valve holding shoe.
Figure 2:
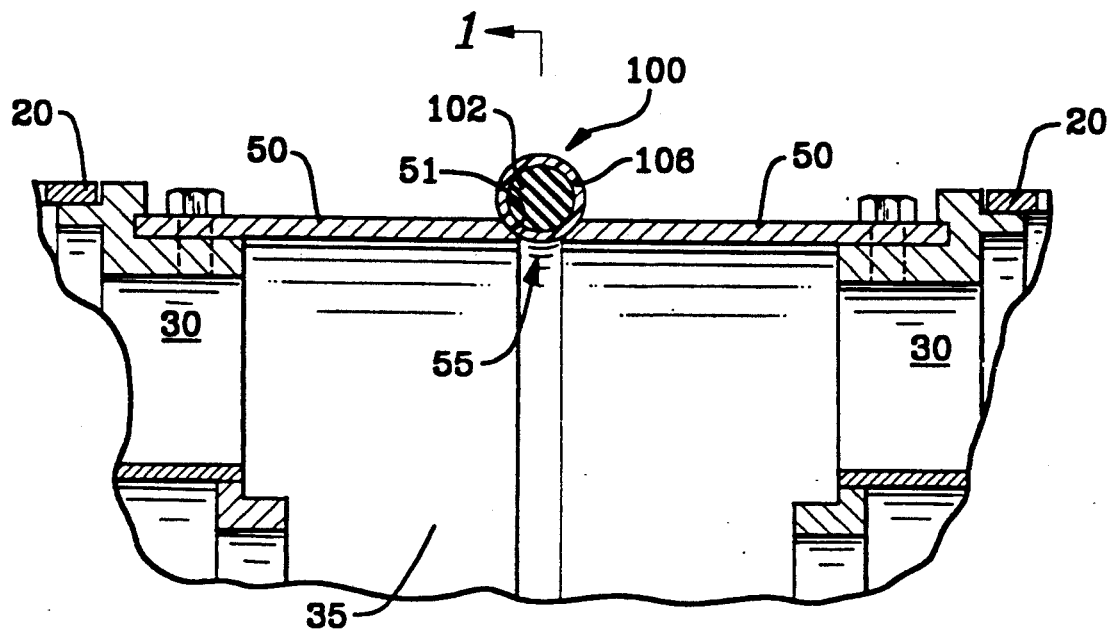
FIG. 2 is a schematic view taken from line 2—2 of FIG. 1 to show a fragmentary cross sectional tangential view of the seal of the present invention.
Figure 3:
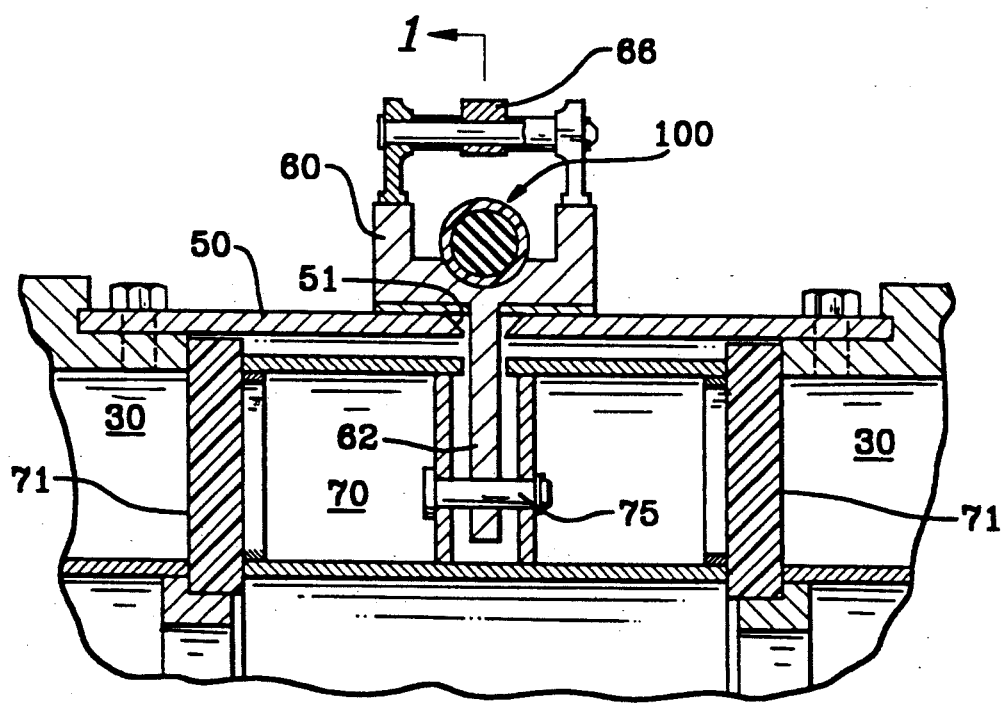
FIG. 3 is a view from line 3—3 of FIG. 1 showing the seal of the present invention in the area of the valve holding shoe and valve body in its channel flow arresting position.

FIGS. 2 and 2a also show deck 20 and valve covers 50 whose beveled sealing edges 51 define slot 55. Fluid channels 30 communicate with stationary valve 70 as shown in FIG. 3. Valve holding shoe 60, in FIG. 3, has a blade 62 which connects to valve 70 by means of pin 75 and a slide groove 65 shown in FIG. 3a which guides and supports seal 100 as it slides over valve holding shoe 60. FIG. 2a shows how beveled cover plate edges 51 define an angular seal retaining configuration for slot 55. The bevels on edges 51 permits seal 100 to nest partially within slot 55 so that, when installed under tension as is preferred, seal 100 will have a strong tendency to remain within and seal slot 55 and in slide groove 65 of valve holding shoe 60 shown in FIG. 3a. The surface 61 of slide groove 65 is smoothly polished to minimize wear of seal 100 passing over it. Beveled edges 51 of covers 50 only need be smooth enough to provide a seal with seal 100. Since there is no sliding or relative circumferential or lateral motion between seal 100 and edges 51 in slot 55, there is no wearing tendency.

Since the seal 100 is installed under tension, any slight amount of wear experienced is accommodated by a slight relaxation of the seal tension in slot 55. Also, because of its non-flat cross section and its seating into the groove formed by cover plate edges 51 and slot 55, the seal 100 will have no tendency to wander sideways and away from slot 55, but will rather have forces positively retaining it within the slot 55

Figure 4:
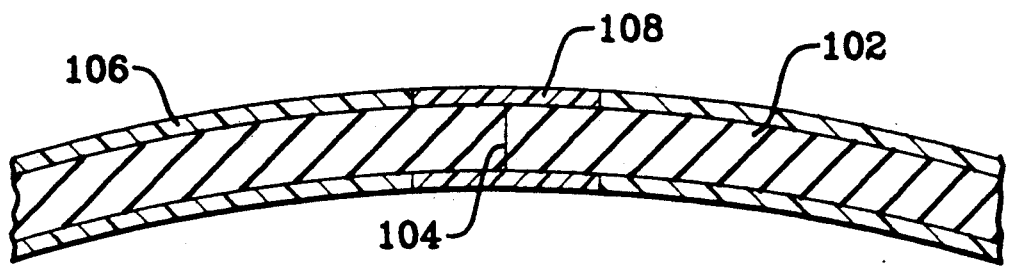
FIGS. 4, 5, and 6 are schematic cross sectional views of the seal of the present invention to illustrate alternative joining methods for the abutting ends of the seal.
Figure 5:
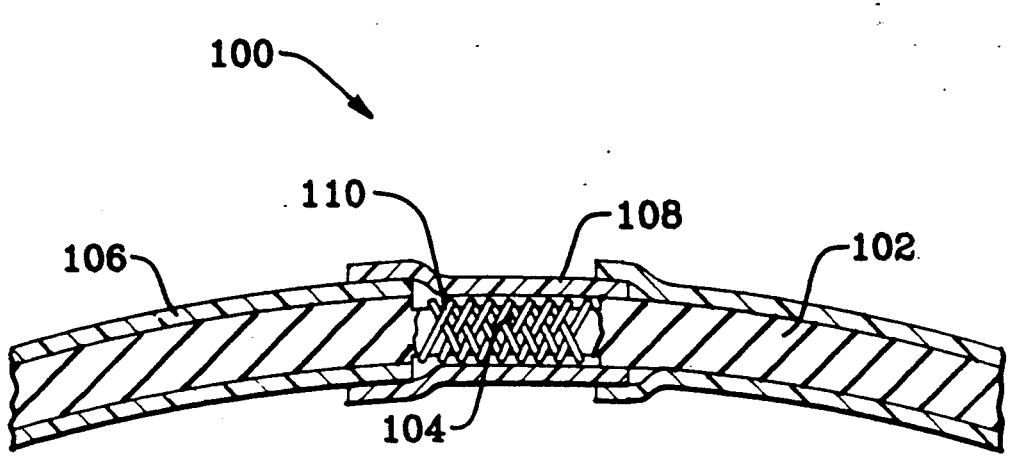
Figure 6:
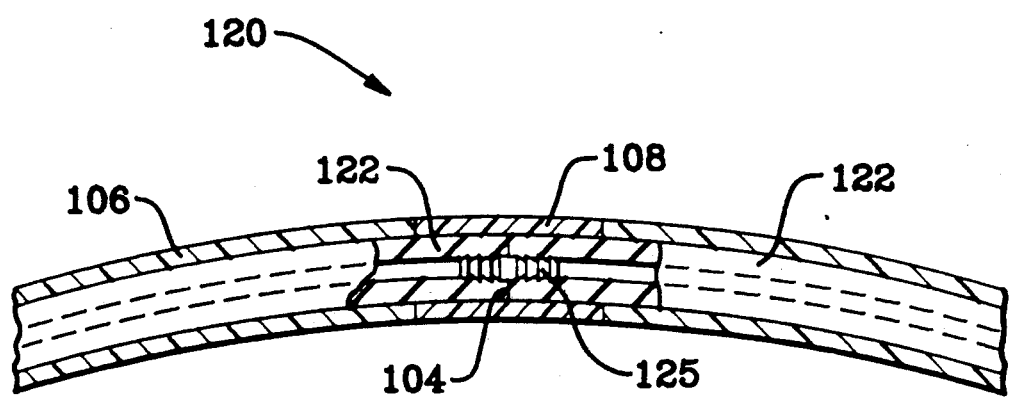

FIGS. 4, 5, and 6 illustrate three possible methods of connecting cut ends of the seal 100 to make it endless. In FIGS. 4 and 5, a solid elastomeric core 102 is employed together with a chemical resistant sheathing layer 106 made from PTFE or other chemical resistant materials, while in FIG. 6 a tubular elastomeric core 122 is used with the same chemical resistant sheathing 106. Thus, the difference between seal 100 in FIGS. 4 and 5 and seal 120 in FIG. 6 lies in the provision of solid or tubular elastomeric core 102 or 122, respectively. Since core 122 is used with a barb 125 to reinforce bonded joint 104, only adhesive or solvent bonding is practical for seal 120. Solid core 102 can be adhesively bonded, solvent bonded, or fusion bonded depending on its composition. In all cases, the joint is illustrated as a square butt joint; however, it could as well be a scarf joint or other design. FIG. 5 illustrates mechanical reinforcement provided for the adhesive bonded joint 104 by use of a braided tubular sleeve 110 which, when slipped over the cut ends of elastomeric core 102, provides gripping force to the two cut ends in response to tensile forces tending to separate the ends. The braided construction allows sleeve 110 to loosen under axial compression while it tightens under axial tensile loading.

In all three cases, before joining the cut ends of the core 102 or 122, the chemical resistant sheathing 106 is stripped back from the cut ends of the core. Thus, to restore the chemical resistance desired for the seal, a heat shrinkable chemical resistant sleeve 108 is placed on the seal and, after joint 104 is made, is slid over the joint, and heated to shrink onto the elastomeric core 104 at the joint area and the ends of resistant sleeve 106. After trimming the heat shrinkable sleeve, a continuous seal results without any lip at the joint area. This improves seal life and performance. Alternatively, as shown in FIG. 5, heat shrinkable sleeve 108 may be slid under resistant sheathing 106 in the direction of rotation and left on the outside of sheathing 106 on its opposite end and then heat shrunk to effect sealing to prevent corrosive chemicals from reaching the core 102 or 122 and sleeve 110.

The seal is assembled by wrapping it circumferentially about the drum at the slot, stretching it to an appropriate tension, cutting to length as appropriate for the type of joint, stripping back the chemical resistant sheathing, installing the heat shrinkable chemical resistant sleeve, installing joint reinforcement as appropriate, bonding the joint to form a continuous circular seal, positioning the chemical resistant sleeve over the joint area, and heat shrinking and trimming the heat shrinkable chemical resistant sleeve to blend smoothly with the chemical resistant sheathing of the seal member. The resulting seal nests in the drum slot 55 and is stationary with respect to the valve cover plates so that the only sliding contact is with the smoothly polished groove 61 in the valve holding shoe 60. This minimizes wear of the sealed surface, and it extends the service time period during which the hoop tension in the seal maintains sealing contact about the circumferential drum slot 55. The circular cross section of the seal is preferred because it provides resistance to wandering out of the slot 55 (a problem with flat seals) and simplicity of assembly and ease of fabrication. However, it is contemplated that "V" shaped or other non-flat configurations would be practical in some applications. The combination of elastomeric core and chemical resistant sheathing yields a seal which can provide the desired functional behavior to address the limitations of the current sealing devices.

What is claimed is:

1. In a center valve vacuum filter having a vat; a rotatably mounted drum having a perforated circumferential deck surface within said vat; a plurality of axially extending filtrate channels beneath each cylindrical deck surface of said drum; each said channel being closed at remote ends of said drum and open at at least one generally central location on said drum, said open ends being arrayed entirely around the circumference of the drum and generally defining a filtrate draining annular passageway therebetween; and a stationary valve means for cooperating with said open ends of said channels to sequentially interrupt extraction of filtrate from said channels by interruption of a continuous partial vacuum thereto; the improvement, in combination with said vacuum filter and cylindrically positioned cover plates around and covering the periphery of said annular passageway and forming a circumferential slot therebetween, comprising:

a single piece circumferential seal means having a non-flat sealing surface for maintaining sealing contact with opposing edges of said rotating drum cover plates at said circumferential slot therebetween and sliding contact over said stationary valve means.

2. The combination of claim 1, wherein said circumferential seal means comprises a continuous hoop formed by joining mating cut ends of an elongate flexible member.

3. The combination of claim 2, wherein said hoop is installed on said drum under elastic tension.

4. The combination of claim 2, wherein said elongate flexible member has a length less than the circumference of said drum wrapped about the circumference of said drum.

5. The combination of claim 4, wherein said cut ends are joined by thermal fusion.

6. The combination of claim 4, wherein said elongate member has a circular cross section.

7. The combination of claim 6, wherein said cut ends are joined by insertion into opposite ends of a braided flexible sleeve until said cut ends are firmly abutted to each other, said sleeve braiding allowing the sleeve to expand radially when compressed axially and to contract radially when extended by a tensile axial force acting to separate said cut ends from each other within said sleeve.

8. The combination of claim 4, wherein said elongate flexible member comprises an elastomeric core with a chemical resistant surface layer.

9. The combination of claim 4, further comprising:
a chemical resistant sleeve shrink fitted over the joined ends of said elongate flexible member.

10. The combination of claim 1, wherein said seal means comprises an elongate flexible member having an elastomeric core and a chemical resistant surface layer, said member being formed into a hoop and having abutting ends joined for continuity.

* * * * *